Oct. 30, 1962 M. W. GRIBBLE ETAL 3,061,821

INFORMATION STORAGE DEVICES

Filed March 8, 1960

*Inventors*
MAURICE W. GRIBBLE
DAVID RUSHTON
By
Cameron, Kerkam & Sutton
*Attorneys*

3,061,821
Patented Oct. 30, 1962

3,061,821

INFORMATION STORAGE DEVICES

Maurice Woolmer Gribble, Romiley, Stockport, and David Rushton, Burnley, England, assignors to Ferranti, Limited, Hollinwood, England, a company of Great Britain and Northern Ireland Filed Mar. 8, 1960, Ser. No. 13,525
Claims priority, application Great Britain Mar. 17, 1959
6 Claims. (Cl. 340—174)

This invention relates to information storage devices for use with electronic computers.

In electronic computers it is frequently necessary to store information in a permanent or semi-permanent form, such information being, for example, tables of values or programmes concerned with the computer input and output, or library sub-routines. It is important that such information should not be destroyed by a failure of the power supply or inadvertently by the programmer and it is an advantage if the storage device has a fast access time. Accordingly, it is an object of the present invention to provide a storage device in which information is stored in a semi-permanent form and which is both inexpensive and simple to manufacture and has an extremely fast access time.

According to the present invention an information storage device comprises first and second sets of pairs of adjacent spaced electrical conductors, said sets of conductors being mounted respectively in first and second adjacent spaced parallel planes, one conductor of each pair being electrically connected in series with the other conductor in such manner that current flowing in one direction in one conductor of a pair flows in the opposite direction in the other conductor of the pair, said sets of conductors being so disposed that each pair of conductors of said first set crosses over each pair of conductors of said second set thus forming a plurality of storage locations each of which is uniquely defined by the cross-over of a particular pair of conductors from both of said sets, information being stored in the device at any required storage location by the presence of a piece of ferromagnetic material which links inductively the two pairs of conductors which cross over at the required storage location.

Said first and second sets of conductors may be sets of parallel pairs of conductors, and the conductors of said first set may extend in a direction substantially perpendicular to the conductors of said second set.

Said first and second adjacent parallel planes may be the two major surfaces of a sheet of electrically non-conductive material.

Said first and second sets of parallel pairs of spaced electrical conductors may be formed on said surfaces by printed circuitry techniques.

Said pieces of ferromagnetic material may be in the form of pegs which may be inserted in holes provided at each storage location.

Figure 1:
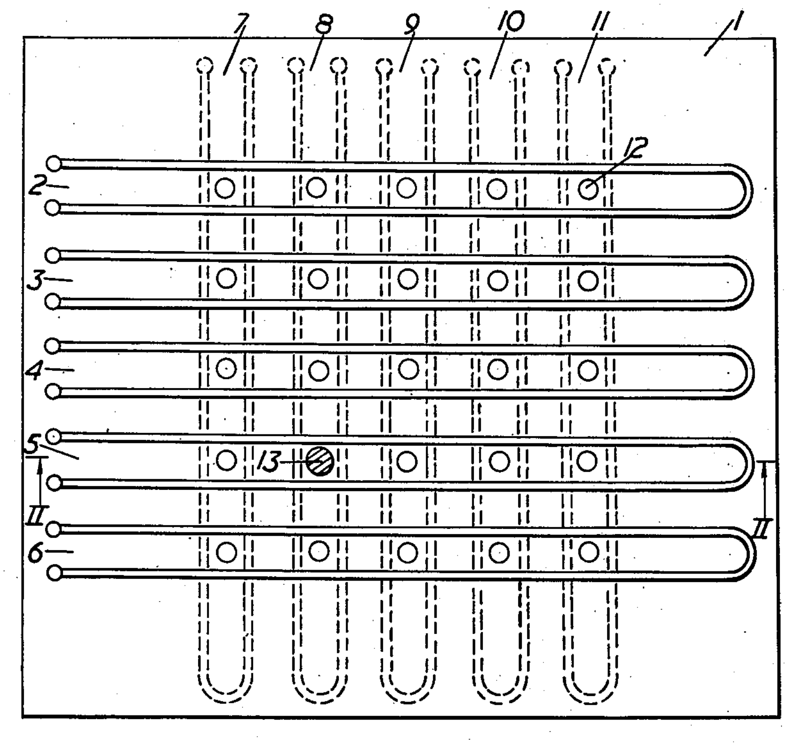
Figure 2:
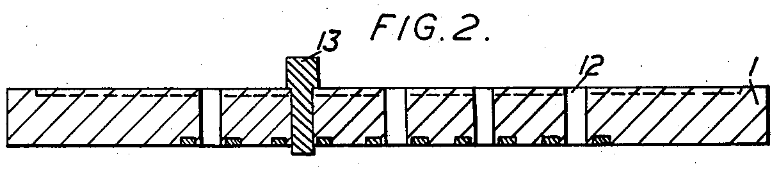

One embodiment of the present invention will now be described by way of example with reference to the accompanying drawings in which:

FIGURE 1 is a plan view of one form of information storage device in accordance with the invention, and FIGURE 2 is a sectional view along the line II—II in FIGURE 1.

Referring now to the drawings the information storage device comprises a base-board 1 of electrically insulating material. On one side of the base-board 1 there is printed by printed circuitry techniques a first set of five parallel pairs of spaced conductors 2, 3, 4, 5, and 6 forming the rows of the storage device and on the other side of the base-board 1 there is printed a second set of five parallel pairs of spaced conductors 7, 8, 9, 10 and 11 forming the columns of the storage device, the direction of the second set of conductors being perpendicular to that of the first set of conductors. One conductor of each pair is electrically connected to the other conductor of the pair, as shown, in such manner that current flowing in one direction in one conductor of a pair flows in the opposite direction in the other conductor of the pair.

At each of the locations defined by the cross-overs between pairs of conductors forming the rows and pairs of conductors forming the columns holes 12 are drilled in the base-board 1 into which may be inserted pegs, such as 13, of ferrite material.

In operation of the device, when there are no pegs 13 inserted in any of the holes 12 a current pulse flowing in any of the pairs of conductors forming the rows of the device will not induce any voltage output in any of the pairs of conductors forming the columns of the device due to the two sets of conductors being arranged perpendicularly. When there is a peg 13 in one of the holes 12, however, an inductive coupling is established between the two pairs of conductors which overlap at the location of the peg 13, in which case a current pulse flowing in one of the pairs of conductors will induce a voltage output in the other pair of conductors.

For example, the peg 13 shown in FIGURE 1 is positioned at the cross-over of the pair of conductors 5 and the pair of conductors 8. Therefore a current pulse flowing in the pair of conductors 5 will induce a voltage output in the pair of conductors 8. Small output voltages may also be induced in adjacent conductors, but these will be in the opposite direction to the output voltages normally induced and are therefore simple to reject. For this reason it is preferable that the pairs of conductors should not be spaced too closely and this is also preferable to prevent the effect of any one ferrite peg being made less when the peg is surrounded by other pegs in adjacent holes.

It will be seen that information may thus be stored in the device by the insertion of pegs such as the peg 13 at specified locations. For the sake of simplicity the storage device has been shown with only five rows and five columns, but in practice these numbers would be considerably increased. For example, a practical storage device of this kind has sixty-four rows and twenty-four columns.

It will be appreciated that the device described above may be modified in many ways. For example, the two sets of conductors may be printed on separate base-boards, the two base-boards being clamped a set distance apart and holes provided in each base-board for the insertion of the pegs. Also the sets of conductors need not be printed on the base-boards but may be copper strips or wires bonded to the base-boards by any suitable means. Furthermore, the set of conductors need not be sets of parallel pairs of conductors and the conductors of one set need not extend in a direction perpendicular to the conductors of the other set. However, if the conductors do not cross over perpendicularly a current pulse flowing in one pair will induce a small output in any pair which it crosses. This output will be very much smaller than that induced when a peg is present in a storage location, but it may be sufficient to require the use of amplitude discriminators to detect the true outputs.

The storage device described above is inexpensive and simple to manufacture. The information stored in the device is semi-permanent in that it is not affected by such faults as failure of power supplies, but the information stored may readily be changed by an operator. The storage device also has an extremely fast access time which is in fact only limited by the speed of response of the associated equipment such as electronic amplifiers.

What we claim is:

1. An information storage device comprising first and second sets of pairs of adjacent spaced electrical conductors, means for mounting said first and second sets of conductors respectively in first and second adjacent spaced parallel planes, one conductor of each pair being electrically connected in series with the other conductor in such manner that current flowing in one direction in one conductor of a pair flows in the opposite direction in the other conductor of the pair, said sets of conductors being so disposed that each pair of conductors of said first set crosses over each pair of conductors of said second set, whereby a plurality of storage locations are formed each of which locations is uniquely defined by the cross-over of a particular pair of conductors of said first set and a particular pair of conductors of said second set and means for storing information in the device at any required storage location consisting of a piece of ferromagnetc material selectively placeable so as to link inductively the two pairs of conductors which cross over at the required storage location.

2. An information storage device as claimed in claim 1 in which said first and second sets of conductors are sets of parallel pairs of conductors.

3. An information storage device as claimed in claim 2 in which the conductors of said first set extend in a direction substantially perpendicular to the conductors of said second set.

4. An information storage device as claimed in claim 1 including a sheet of electrically non-conductive material having two major surfaces constituting said first and second adjacent spaced parallel planes.

5. An information storage device as claimed in claim 4 in which said sets of conductors are printed on said surfaces.

6. An information storage device as claimed in claim 1 including a plurality of pieces of ferromagnetic material in the form of pegs, and wherein each storage location comprises a hole into which one of said pegs may be inserted.

References Cited in the file of this patent

UNITED STATES PATENTS

| | | |
|---|---|---|
| 2,719,965 | Person | Oct. 4, 1955 |
| 2,814,031 | Davis | Nov. 19, 1957 |
| 2,922,145 | Bobeck | Jan. 19, 1960 |
| 3,027,548 | Vaughan | Mar. 27, 1962 |

Notice of Adverse Decision in Interference

In Interference No. 93,481 involving Patent No. 3,061,821, M. W. Gribble and D. Rushton, Information storage devices, final judgment adverse to the patentees was rendered Oct. 23, 1963, as to claims 1, 2, 3, 4, 5 and 6.

[*Official Gazette February 4, 1964.*]